(12) United States Patent
Ono

(10) Patent No.: US 10,963,383 B2
(45) Date of Patent: Mar. 30, 2021

(54) HARDWARE ASSISTED REMOTE TRANSACTIONAL MEMORY

(71) Applicant: LENOVO ENTERPRISE SOLUTIONS (SINGAPORE) PTE. LTD., Singapore (SG)

(72) Inventor: Makoto Ono, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 225 days.

(21) Appl. No.: 15/979,511

(22) Filed: May 15, 2018

(65) Prior Publication Data

US 2019/0354481 A1 Nov. 21, 2019

(51) Int. Cl.
*G06F 12/084* (2016.01)

(52) U.S. Cl.
CPC ...... *G06F 12/084* (2013.01); *G06F 2212/656* (2013.01)

(58) Field of Classification Search
CPC .................. G06F 12/084; G06F 2212/656
See application file for complete search history.

(56) References Cited

U.S. PATENT DOCUMENTS

| 2010/0211742 | A1* | 8/2010 | Turullols | G06F 12/0859 |
| | | | | 711/119 |
| 2017/0269960 | A1* | 9/2017 | Diestelhorst | G06F 9/3842 |
| 2019/0108068 | A1* | 4/2019 | Britkin | G06F 9/544 |

* cited by examiner

*Primary Examiner* — Eric Cardwell

(57) ABSTRACT

Hardware assisted remote transactional memory including receiving, from a first remote processor over a high-speed communications fabric, an indication of a beginning of a first memory transaction; queuing, in a first hardware memory assistant, memory instructions for the first memory transaction; receiving, from a second remote processor over the high-speed communications fabric, an indication of a beginning of a second memory transaction; queuing, in a second hardware memory assistant, memory instructions for the second memory transaction; receiving, from the first remote processor over the high-speed communications fabric, an indication of an ending of the first memory transaction; comparing memory addresses accessed in the first memory transaction to memory addresses accessed in the second memory transaction; and in response to determining that the memory addresses accessed in the first memory transaction overlap with the memory addresses accessed in the second memory transaction, aborting the first memory transaction.

20 Claims, 7 Drawing Sheets

HARDWARE ASSISTED REMOTE TRANSACTIONAL MEMORY

BACKGROUND

Field of the Invention

The field of the invention is data processing, or, more specifically, methods, apparatus, and products for hardware assisted remote transactional memory.

Description of Related Art

Under memory-centric computing and other architectures in which physical computing components are not local to shared memory, remote shared memory must be implemented. When designing remote shared memory, in addition to enabling low latency, high bandwidth remote memory access technology, it is also important to maintain memory data consistency across multiple access points. When memory is cacheable from a remote system, cache coherency across multiple systems sharing the memory must be maintained. This will generate a high volume cache coherency maintenance protocol over fabric and will impact the entire memory sharing performance.

SUMMARY

Methods, systems, and apparatus for hardware assisted remote transactional memory are disclosed in this specification. Hardware assisted remote transactional memory includes receiving, from a first remote processor over a high-speed communications fabric, an indication of a beginning of a first memory transaction; queuing, in a first hardware memory assistant, memory instructions for the first memory transaction received from the first remote processor over the high-speed communications fabric; receiving, from a second remote processor over the high-speed communications fabric, an indication of a beginning of a second memory transaction; queuing, in a second hardware memory assistant, memory instructions for the second memory transaction received from the second remote processor over the high-speed communications fabric; receiving, from the first remote processor over the high-speed communications fabric, an indication of an ending of the first memory transaction; comparing memory addresses accessed in the first memory transaction to memory addresses accessed in the second memory transaction; and in response to determining that the memory addresses accessed in the first memory transaction overlap with the memory addresses accessed in the second memory transaction, aborting the first memory transaction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
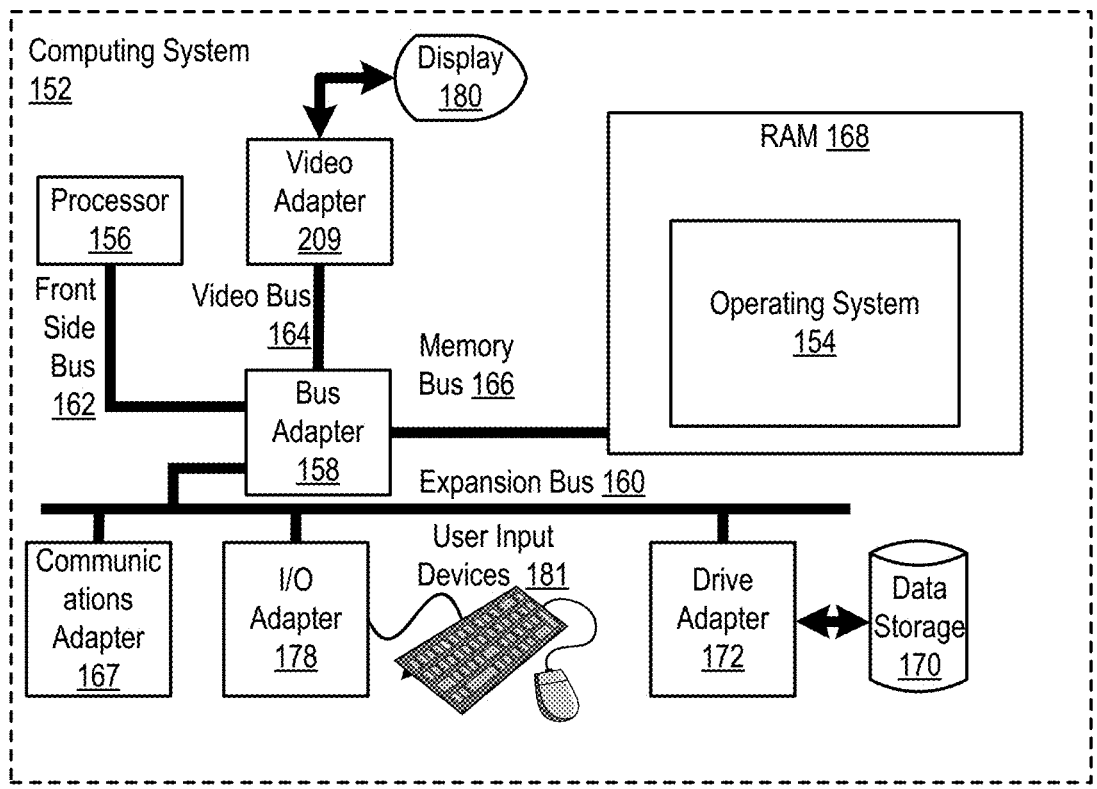
FIG. 1 sets forth a block diagram of an example system configured for hardware assisted remote transactional memory according to embodiments of the present invention.

Exemplary methods, apparatus, and products for hardware assisted remote transactional memory in accordance with the present invention are described with reference to the accompanying drawings, beginning with FIG. 1. FIG. 1 sets forth a block diagram of automated computing machinery comprising an exemplary computing system (152). The computing system (152) of FIG. 1 includes at least one computer processor (156) or 'CPU' as well as random access memory (168) ('RAM') which is connected through a high-speed memory bus (166) and bus adapter (158) to processor (156) and to other components of the computing system (152).

Stored in RAM (168) is an operating system (154). Operating systems useful in computers configured for hardware assisted remote transactional memory according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for hardware assisted remote transactional memory according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for hardware assisted remote transactional memory according to embodiments of the present invention include modems for wired dial-up communications, Ethernet (IEEE 802.3) adapters for wired data communications, and 802.11 adapters for wireless data communications.

Figure 2:
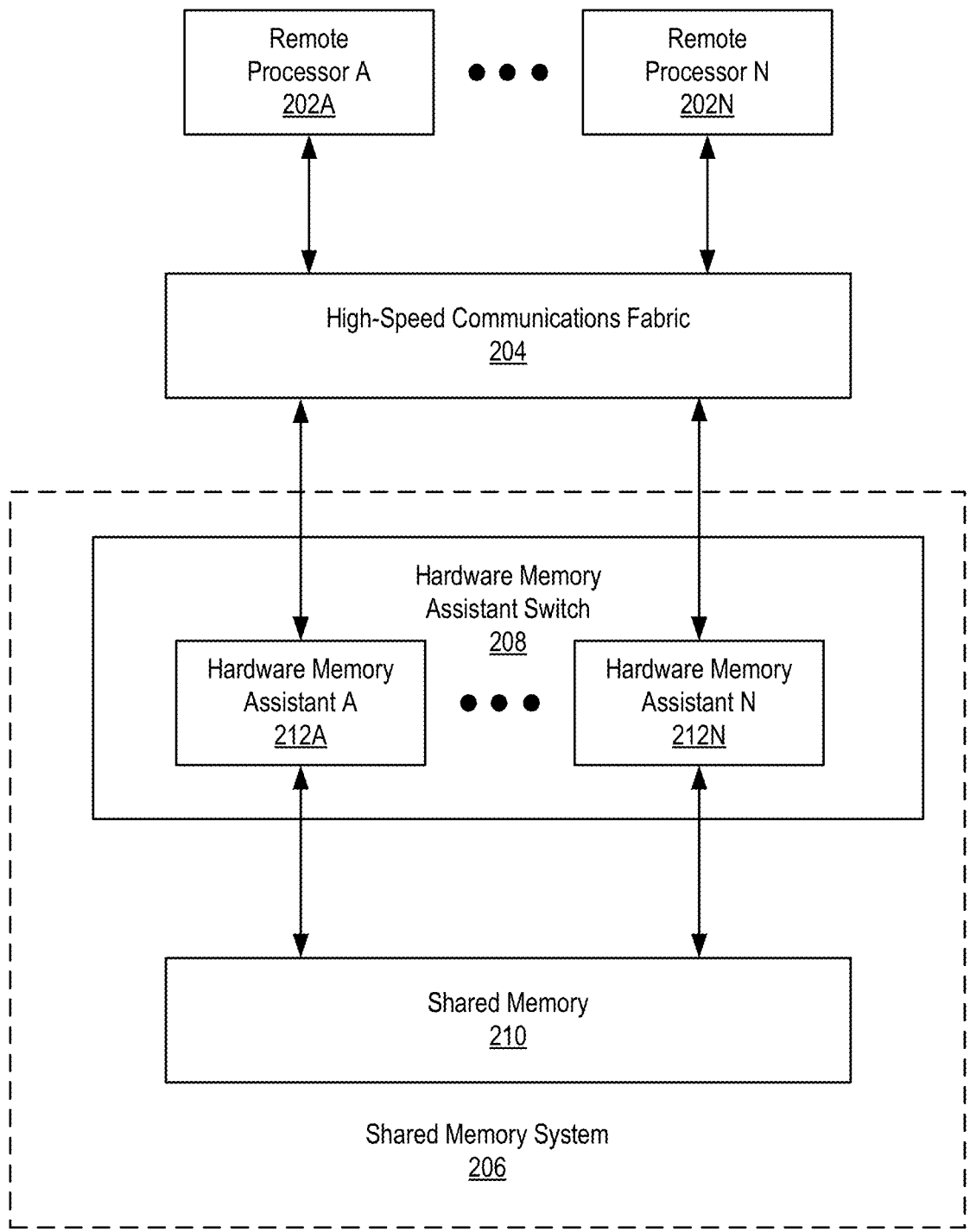
FIG. 2 sets forth a block diagram of an example system configured for hardware assisted remote transactional memory according to embodiments of the present invention.

FIG. 2 shows an exemplary system for hardware assisted remote transactional memory according to embodiments of the present invention. As shown in FIG. 2, the exemplary system includes multiple remote processors (remote processor A (202A), remote processor N (202N)), each coupled to a shared memory system (206) via a high-speed communications fabric (204). The shared memory system (206) includes a hardware memory assistant switch (208) and a shared memory (210). The hardware memory assistant switch (208) includes multiple hardware memory assistants (hardware memory assistant A (212A), hardware memory assistant N (212N)). In contrast to FIG. 1, FIG. 2 shows a system in which memory is pooled in a shared memory system (206) and processors (remote processor A (202A), remote processor N (202N)) access the shared memory (210) via a high-speed communications fabric (204), instead of the front side bus and memory bus as shown in FIG. 1.

Each remote processor (remote processor A (202A), remote processor N (202N)) is a processing unit that is physically remote from the shared memory system (206) and coupled to the shared memory system via the high-speed communications fabric (204). The term remote refers to a processor that is physically separated from the shared memory system (206) and coupled to the shared memory system (206) via a high-speed communications fabric (204). Similarly, the shared memory system (206) is remote relative to the remote processors.

Each remote processor may be within a remote server coupled to the shared memory system via the high-speed communications fabric (204). One or more remote processors may be within the same physical housing, or in a physically distinct housing from one or more other remote servers, and from the shared memory system (206). For example, a first server housing two remote processors may be attached, via a high-speed communications fabric (204), to the shared memory system (206). As another example, a first server housing a first remote processor and a second server housing a second remote processor may both be attached, via a high-speed communications fabric (204), to the shared memory system (206). One or more remote processors (remote processor A (202A), remote processor N (202N)) may include other processing components, such as local caches and system-on-a-chip components.

The high-speed communications fabric (204) is a device or group of devices that transfers data between the remote processors (remote processor A (202A), remote processor N (202N)) and the shared memory system (206). The high-speed communications fabric (204) may transfer data at speeds similar to transfer speeds of a memory bus between a processor and memory on the same system. The high-speed communications fabric (204) may be a communications fabric as defined by the Gen-Z specification.

The shared memory system (206) is a collection of memory devices, including the shared memory (210) and the hardware memory assistant switch (208), that service memory transactions from the remote processors (remote processor A (202A), remote processor N (202N)). The shared memory (210) is random access data storage shared between multiple remote processors. The shared memory (210) may be volatile memory. The shared memory (210) may receive memory instructions via the hardware memory assistant switch (208) and service those memory instructions by providing data requested to be read, or storing data requested to be written.

Each remote processor (remote processor A (202A), remote processor N (202N)) may be aware of critical regions of the shared memory (210). A critical region of shared memory (210) is a region of shared memory accessed by multiple remote processors. Without a protection scheme in place, multiple remote processors accessing the same region of shared memory (210) may result in a loss of cache coherency. To avoid cache coherency issues, each remote processor may use memory transactions to access critical regions of shared memory (instead of sending individual read and write instructions to the shared memory (210)).

The hardware memory assistant switch (208) is a collection of hardware memory assistants (hardware memory assistant A (212A), hardware memory assistant N (212N)) and logic that directs memory instructions to one of the hardware memory assistants based on the source of the memory instruction. The hardware memory assistant switch (208) may also aide the hardware memory assistants in locking other hardware memory assistants and comparing the memory addresses in the queued memory instructions on each hardware memory assistant.

The hardware memory assistant switch (208), including each hardware memory assistant (hardware memory assistant A (212A), hardware memory assistant N (212N)) may be logical components of one or more integrated circuits. Further, the hardware memory assistant switch (208) and each hardware memory assistant may be logical components of a single integrated circuit, such as an application specific integrated circuit.

Each hardware memory assistant (hardware memory assistant A (212A), hardware memory assistant N (212N)) is a collection of hardware logic that services memory instructions from the remote processors (remote processor A (202A), remote processor N (202N)). The memory assistants are hardware memory assistants in that the memory assistants are collections of components within an integrated circuit, in contrast to a software mutex. Each hardware memory assistant may be associated with a different and specific remote processor. For example, each memory instruction received from remote processor A (202A) may be serviced by hardware memory assistant A (212A). The hardware memory assistant switch (208) may assign hardware memory assistants to remote processors.

Memory instructions are instructions to access memory. Memory instructions may be read instructions or write instructions. A read instruction may include an address in the shared memory (210) from which to read. A write instruction may include an address in the shared memory (210) and data to be written to the address. A memory transaction is a collection of memory instructions that begins with an indication of the beginning of the memory transaction (i.e., a TX_BEGIN message) and ends with an indication of the end of the memory transaction (i.e., a TX_END message).

The hardware memory assistants may include a queue, address comparison logic, memory access logic, locking management logic, and processor notification logic. The queue is a data structure that stores memory instructions received from the remote processor. The queue may store each memory instruction (or a portion of memory instructions) in a memory transaction. The queue may store write instructions (and the associated data) that have not yet been committed to shared memory, but may also store addresses of read instructions already serviced by the hardware memory assistant (but not yet confirmed to the remote processor). The queue may also include logic that transmits the memory instructions for commitment to the shared memory (210), and to discard the memory instructions if the memory transaction is aborted.

The memory access logic is logic within each hardware memory assistant that services the memory instructions stored in the queue. Servicing the memory instructions may include forwarding the memory instructions to the shared memory (210) where data is written in the case of write instructions, and where data is read and provided to the remote processor in the case of read instructions.

The memory access logic may also service read instructions upon receipt in the queue, before the memory transaction is committed or aborted. Upon receiving a read instruction, the memory access logic may first search the queue of the hardware memory assistant for a write instruction that stores data at the memory address targeted by the read instruction. If a write instruction targeting the same memory address is in the queue ahead of the read instruction, the memory access logic returns the data from the write instruction. If no write instruction targeting the same memory address exists in the queue, the memory access logic services the read instruction from the memory address in the shared memory (210).

The address comparison logic is logic within each hardware memory assistant that transmits memory addresses to each other hardware memory assistant for comparison to the memory addresses referenced in the memory instructions stored in the queues of each hardware memory assistant. The address comparison logic may also receive a memory address or list of memory address from another hardware memory assistant and compare those addresses to the addresses referenced in the memory instructions stored in the queue of the hardware memory assistant. The address comparison logic may also respond to the request for comparison with an indication that at least one memory address matches the memory address or addresses provided by the other hardware memory assistant. The address comparison logic may also respond with an indication that no memory addresses match the memory address or addresses provided by the other hardware memory assistant.

The locking management logic is logic within each hardware memory assistant that locks the servicing of memory instructions on the hardware memory assistant and coordinates the locking of other hardware memory assistants. Locking a hardware memory assistant refers to stopping the receiving and servicing of memory instructions on the hardware memory assistant. Upon receiving an indication of the end of the memory transaction (i.e., a TX_END message), the locking management logic requests that all other hardware memory assistants are locked. After the hardware management assistant initiating the lock has either committed or aborted the memory transaction, the locking management logic instructs the locked hardware management assistants to unlock and resume receiving and servicing memory instructions.

Processor notification logic is logic within each hardware memory assistant that communicates with the remote processor assigned to the hardware memory assistant. If the memory transaction is successful, the processor notification logic may send a confirmation to the remote processor that the memory transaction has been committed to memory. If the memory transaction is not successful, the processor notification logic may send an abort message to the remote processor indicating that the memory transaction has been aborted. The processor notification logic may also provide data in response to read instructions received in a memory transaction (that may later be aborted due to a failed memory transaction).

Figure 3:
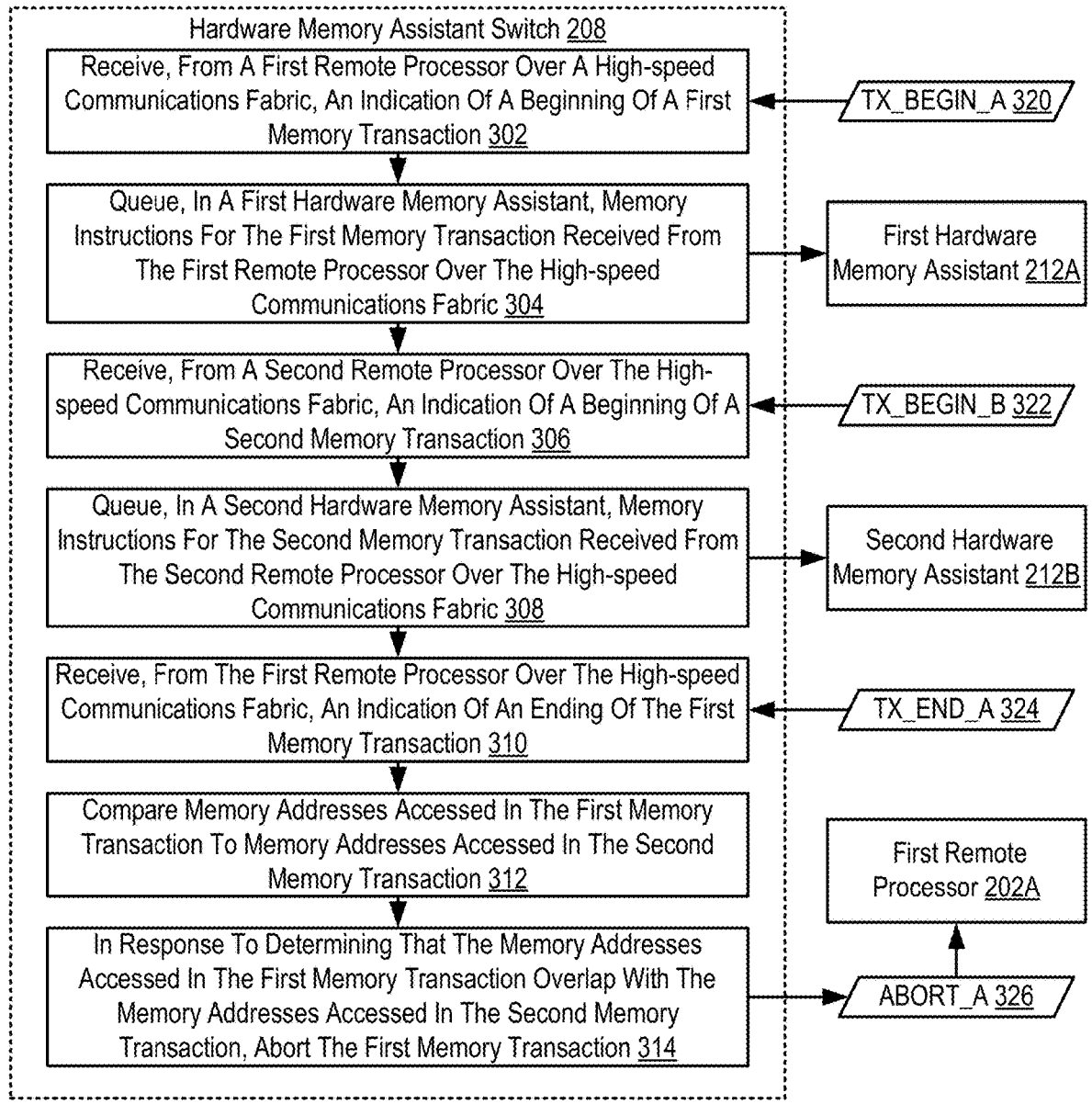
FIG. 3 sets forth a flow chart illustrating an exemplary method for hardware assisted remote transactional memory according to embodiments of the present invention.

For further explanation, FIG. 3 sets forth a flow chart illustrating an exemplary method for hardware assisted remote transactional memory according to embodiments of the present invention that includes receiving (302), from a first remote processor (202A) over a high-speed communications fabric, an indication of a beginning of a first memory transaction (320). Receiving (302), from a first remote processor (202A) over a high-speed communications fabric, an indication of a beginning of a first memory transaction (320) may be carried out by the first hardware memory assistant (212A) receiving a TX_BEGIN_A (320) message from the first remote processor (202A) assigned to the first hardware memory assistant (212A). The TX_BEGIN_A (320) message indicates the beginning of a memory transaction that includes multiple memory instructions (i.e., read instructions and write instructions) and ends with a TX_END_A (324) message. The TX_BEGIN_A (320) message may be routed, by the hardware memory assistant switch (208), to the first hardware memory assistant (212A) assigned to the first remote processor (202A).

The method of FIG. 3 further includes queuing (304), in a first hardware memory assistant (212A), memory instructions for the first memory transaction received from the first remote processor (202A) over the high-speed communications fabric. Queuing (304), in a first hardware memory assistant (212A), memory instructions for the first memory transaction received from the first remote processor (202A) over the high-speed communications fabric may be carried out by receiving, from the first remote processor (202A), a group of memory instructions with an associated order and placing the memory instructions in the queue of the first hardware memory assistant (212A). The memory instructions may be routed by the hardware memory assistant switch (208) based on the sender of the memory instructions (i.e., the first remote processor (202A)).

Memory instructions that are write instructions are queue and but not executed (i.e., committed to shared memory) before the TX_END message is received. Memory instructions that are read instructions may be serviced before the TX_END message is received (and before the memory transaction is committed and the confirmation is to the remote processor). Specifically, once the hardware memory assistant receives a read instruction, the hardware memory assistant may first search the queue to determine if a prior write instruction exists targeting the same memory address. If the prior write instruction exists, then the data from the last-received write instruction targeting the same memory address is provided back to the remote processor. If no prior write instruction exists targeting the same memory address, then the shared memory is accessed at the memory address and the data stored therein is provided to the remote processor. Note that if the memory transaction is eventually aborted, the remote processor will invalidate the received read instruction data. The memory address accessed by the read instruction may be stored in the queue even after the read instruction has been serviced in for comparison to other memory instructions in other memory transactions.

Because memory instructions that are read instructions are serviced as they are received, only a portion of the read instructions are stored in the queue. Specifically, only a read address of the read instruction may be stored in the queue. For example, the first hardware memory assistant (212A) may receive a TX_BEGIN message followed by a first read instruction "READ_x1000", a write instruction "WRITE_x1000 HELLO WORLD", and a second read instruction "READ_x1000". The queue may store the address "x1000", the write instruction "WRITE_x1000 HELLO WORLD", and the address "x1000". The memory instructions may be queued in order of execution, or each memory instruction may include an indication of the order of execution.

The method of FIG. 3 further includes receiving (306), from a second remote processor over the high-speed communications fabric, an indication of a beginning of a second memory transaction (322). Receiving (306), from a second remote processor over the high-speed communications fabric, an indication of a beginning of a second memory transaction (322) may be carried out by the second hardware memory assistant (212B) receiving a TX_BEGIN_B (322) message from the second remote processor assigned to the second hardware memory assistant (212B). The TX_BEGIN_B (322) message indicates the beginning of a memory transaction that includes multiple memory instructions (i.e., read instructions and write instructions) and ends with a TX_END B message. The TX_BEGIN_B (322) message may be routed, by the hardware memory assistant switch, to the second hardware memory assistant (212B) assigned to the second remote processor (202A).

The method of FIG. 3 further includes queuing (308), in a second hardware memory assistant (212B), memory instructions for the second memory transaction received from the second remote processor over the high-speed communications fabric. Queuing (308), in a second hardware memory assistant (212B), memory instructions for the second memory transaction received from the second remote processor over the high-speed communications fabric may be carried out by receiving, from the second remote processor, a group of memory instructions with an associated order and placing the memory instructions in the queue of the second hardware memory assistant (212B). The memory instructions may be routed by the hardware memory assistant switch based on the sender of the memory instructions (i.e., the second remote processor (202A)).

The method of FIG. 3 further includes receiving (310), from the first remote processor (202A) over the high-speed communications fabric, an indication of an ending of the first memory transaction (324). Receiving (310), from the first remote processor (202A) over the high-speed communications fabric, an indication of an ending of the first memory transaction (324) may be carried out by the first hardware memory assistant (212A) receiving a TX_END_A (324) message from the first remote processor (202A) assigned to the first hardware memory assistant (212A). The TX_END_A (324) message indicates the end of a memory transaction that included the previously sent memory instructions (i.e., read instructions and write instructions) and began with the TX_BEGIN_A (320) message. The TX_END_A (324) message may be routed, by the hardware memory assistant switch, to the first hardware memory assistant (212A) assigned to the first remote processor (202A).

The method of FIG. 3 further includes comparing (312) memory addresses accessed in the first memory transaction to memory addresses accessed in the second memory transaction. Comparing (312) memory addresses accessed in the first memory transaction to memory addresses accessed in the second memory transaction may be carried out by the first hardware memory assistant (212A) searching the queue of the second hardware memory assistant (212B) (and any other hardware memory assistant on the hardware memory assistant switch) for any memory instructions that reads or writes to any of the address in the memory instructions of the first memory transaction stored in the queue of the first hardware memory assistant (212A).

The first hardware memory assistant (212A) may query the second hardware memory assistant (212B) with a list of each memory address referenced in the first memory transaction. The second hardware memory assistant (212B) may search the queue and determine if any of the memory instructions in the second memory transaction received so far reference any of the addresses listed in the list of addresses received from the first hardware memory assistant (212A).

For example, the first memory transaction may include a first read instruction "READ_x1001", a write instruction "WRITE_x1002 "HELLO WORLD", and a second read instruction "READ_x1003". The second memory transaction may, so far, include only a write instruction "WRITE_x1003 "YOKOHAMA". After a TX_END message is received for the first transition, the first hardware memory assistant (212A) may compare memory addresses accessed in the first memory transaction to memory addresses accessed in the second memory transaction by sending memory addresses "x1001", "x1102", and "x1103" to the second hardware memory assistant (212B). The second hardware memory assistant (212B) may search its queue and determine that the write instruction in its queue accesses the same memory address (i.e., "x1003") received from the first hardware memory assistant (212A).

The method of FIG. 3 further includes, in response to determining that the memory addresses accessed in the first memory transaction overlap with the memory addresses accessed in the second memory transaction, aborting (314) the first memory transaction. Determining that the memory addresses accessed in the first memory transaction overlap with the memory addresses accessed in the second memory transaction may be carried out by determining that at least one memory address accessed in the first memory transaction is the same memory address accessed in the second memory transaction.

Continuing with the example above, assume that upon determining that the write instruction in the second hardware memory assistant (212B) queue accesses one of the memory addresses (i.e., "x1003") received from the first hardware memory assistant (212A), the second hardware memory assistant (212B) responds with an indication that at least one memory address matches the memory addresses provided by the first hardware memory assistant (212A). In response to receiving the indication, the first hardware memory assistant (212A) determines that the memory addresses accessed in the first memory transaction overlap with the memory addresses accessed in the second memory transaction.

Aborting (314) the first memory transaction may be carried out by the first hardware memory assistant (212A) sending an abort message (ABORT_A (326)) to the first remote processor (202A). The first hardware memory assistant (212A) may also purge or flush the queue of the memory instructions received as part of the first memory transaction.

The first memory transaction may also be aborted in response to a determination that the first hardware memory assistant (212A) received an abort message from another hardware memory assistant. During the period of time between the first hardware memory assistant (212A) receiving the TX_BEGIN_A (320) message and the TX_END_A (324) message, another hardware memory assistant may have determined that the memory addresses accessed in another memory transaction overlap with the memory addresses accessed in the first memory transaction. In response, that hardware memory assistant may abort its own memory transaction and send an abort message to the first hardware memory assistant (212A). After receiving the TX_END_A (324) message, the first hardware memory assistant (212A) may determine whether an abort message was received from another hardware memory assistant. If an abort message was received, the first hardware memory assistant (212A) aborts the transaction by sending an abort message (ABORT_A (326)) to the first remote processor (202A).

The steps described above improve the operation of a computing system, generally, by maintaining memory coherency with minimal overhead. Specifically, when multiple remote processors are granted access to the same range of memory addresses, either only one memory instruction is executed at a time (creating long latency for memory access) or multiple instructions are executed near simultaneously (creating coherency problems if two instructions target the same address). By queuing groups of memory instructions (i.e., memory transactions) and providing one at a time access to the shared memory to execute the group of memory transactions (and aborting memory transactions that overlap), coherency is maintained with minimal overhead.

Figure 4:
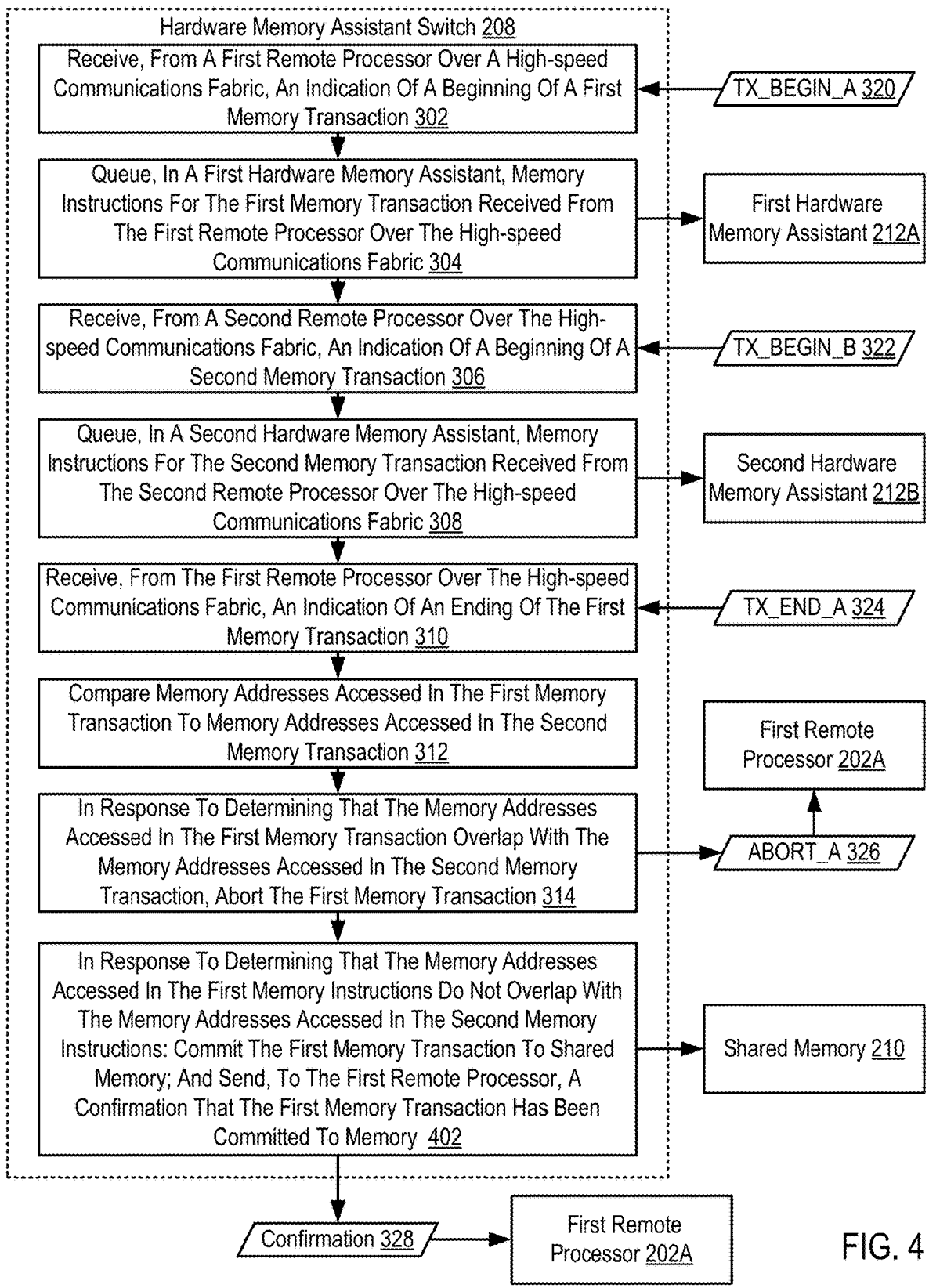
FIG. 4 sets forth a flow chart illustrating an exemplary method for hardware assisted remote transactional memory according to embodiments of the present invention.

For further explanation, FIG. 4 sets forth a flow chart illustrating a further exemplary method for hardware assisted remote transactional memory according to embodiments of the present invention that includes receiving (302), from a first remote processor (202A) over a high-speed communications fabric, an indication of a beginning of a first memory transaction (320); queuing (304), in a first hardware memory assistant (212A), memory instructions for the first memory transaction received from the first remote processor (202A) over the high-speed communications fabric; receiving (306), from a second remote processor over the high-speed communications fabric, an indication of a beginning of a second memory transaction (322); queuing (308), in a second hardware memory assistant (212B), memory instructions for the second memory transaction received from the second remote processor over the high-speed communications fabric; receiving (310), from the first remote processor (202A) over the high-speed communications fabric, an indication of an ending of the first memory transaction (324); comparing (312) memory addresses accessed in the first memory transaction to memory addresses accessed in the second memory transaction; and in response to determining that the memory addresses accessed in the first memory transaction overlap with the memory addresses accessed in the second memory transaction, aborting (314) the first memory transaction.

The method of FIG. 4 differs from the method of FIG. 3, however, in that the method of FIG. 4 further includes in response to determining that the memory addresses accessed in the first memory instructions do not overlap with the memory addresses accessed in the second memory instructions: committing (402) the first memory transaction to memory; and sending, to the first remote processor (202A), a confirmation that the first memory transaction has been committed to memory.

Determining that the memory addresses accessed in the first memory instructions do not overlap with the memory addresses accessed in the second memory instructions may be carried out by determining that none of the memory address accessed by memory instructions in the first memory transaction are accessed by memory instructions in the second memory transaction. For example, assume that upon determining that no memory instruction in the second hardware memory assistant (212B) queue accesses any of the addresses received from the first hardware memory assistant (212A), the second hardware memory assistant (212B) responds with an indication that none of the memory addresses match the memory addresses provided by the first hardware memory assistant (212A). In response to receiving the indication, the first hardware memory assistant (212A) determines that the memory addresses accessed in the first memory transaction do not overlap with the memory addresses accessed in the second memory transaction.

Determining that the memory addresses accessed in the first memory instructions do not overlap with the memory addresses accessed in the second memory instructions may also be carried out by determining that an abort message from another hardware memory assistant has not been received. If the memory addresses accessed in the first memory transaction do not overlap with the memory addresses accessed in the second memory transaction, and no abort message from another hardware memory assistant has been received, then the first memory transaction is committed to the shared memory (210).

Committing (402) the first memory transaction to shared memory (210) may be carried out by servicing, in order, the memory instructions in the first memory transaction. Servicing the memory instructions in the first memory transaction may include storing, in the shared memory (210), data provided in write instructions, and providing, to the first remote processor, data read from memory addresses in read instructions.

Sending, to the first remote processor (202A), a confirmation (328) that the first memory transaction has been committed to memory may be carried out by generating the confirmation (328) and transmitting, by the processor notification logic within the first hardware memory assistant (212A), the confirmation (328) to the first remote processor (202A). The confirmation may include an identifier of the first memory transaction and/or an identifier of each memory instruction executed in the memory transaction.

Figure 5:
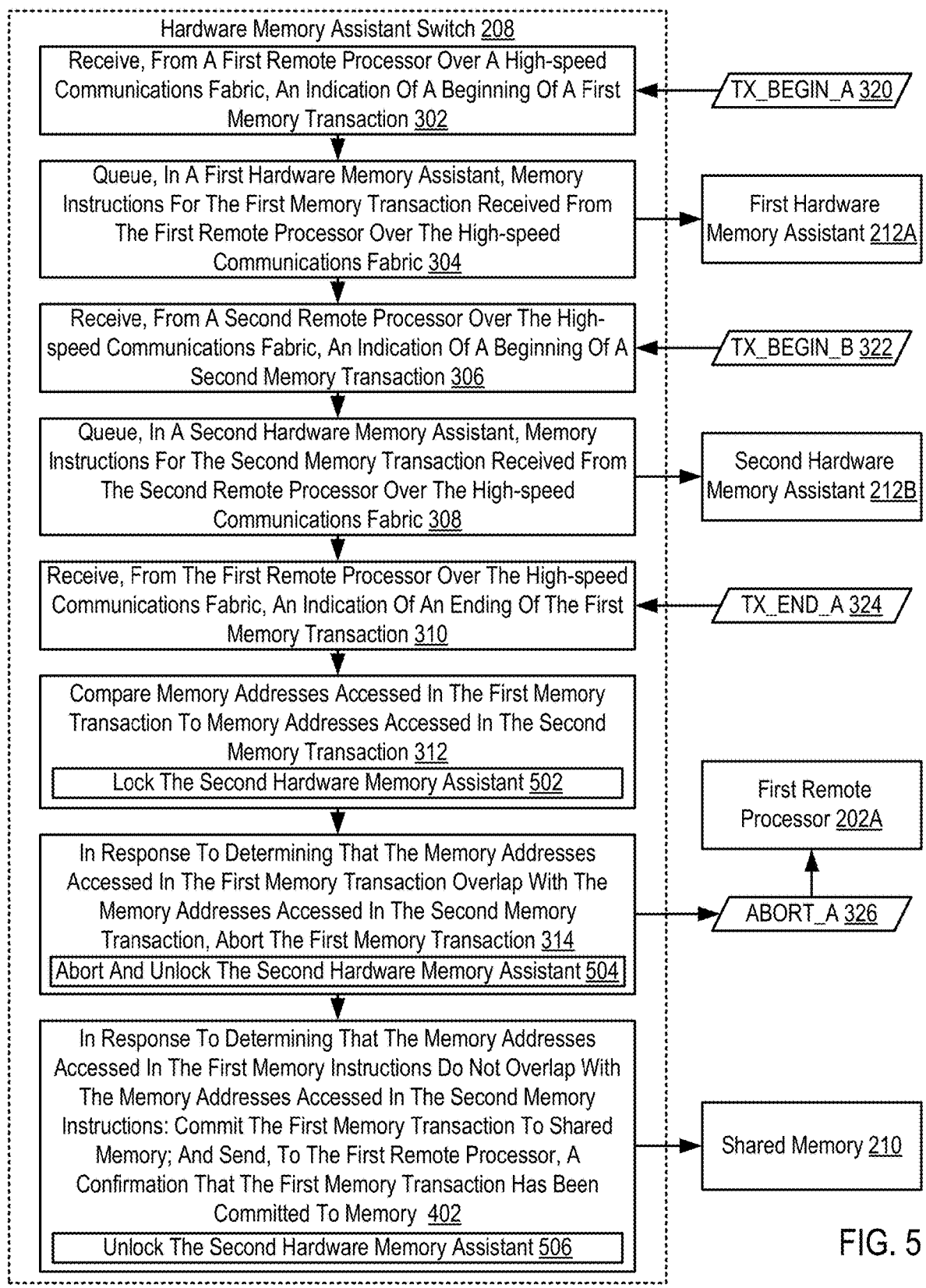
FIG. 5 sets forth a flow chart illustrating an exemplary method for hardware assisted remote transactional memory according to embodiments of the present invention.

For further explanation, FIG. 5 sets forth a flow chart illustrating a further exemplary method for hardware assisted remote transactional memory according to embodiments of the present invention that includes receiving (302), from a first remote processor (202A) over a high-speed communications fabric, an indication of a beginning of a first memory transaction (320); queuing (304), in a first hardware memory assistant (212A), memory instructions for the first memory transaction received from the first remote processor (202A) over the high-speed communications fabric; receiving (306), from a second remote processor over the high-speed communications fabric, an indication of a beginning of a second memory transaction (322); queuing (308), in a second hardware memory assistant (212B), memory instructions for the second memory transaction received from the second remote processor over the high-speed communications fabric; receiving (310), from the first remote processor (202A) over the high-speed communications fabric, an indication of an ending of the first memory transaction (324); comparing (312) memory addresses accessed in the first memory transaction to memory addresses accessed in the second memory transaction; and in response to determining that the memory addresses accessed in the first memory transaction overlap with the memory addresses accessed in the second memory transaction, aborting (314) the first memory transaction.

The method of FIG. 5 differs from the method of FIG. 4, however, in that comparing (312) memory addresses accessed in the first memory transaction to memory addresses accessed in the second memory transaction includes locking (502) the second hardware memory assistant (212B). Locking (502) the second hardware memory assistant (212B) may be carried out by stopping the receiving and servicing of memory instructions on the second hardware memory assistant (212B).

Locking (502) the second hardware memory assistant (212B) may be initiated by the locking management logic on the first hardware memory assistant (212A). The locking management logic may send a locking signal to each other hardware memory assistant instructing the hardware memory assistant to initiate a lock on the hardware memory assistant. In response, each hardware memory assistant may stop receiving memory instructions from the remote processors associated with the hardware memory assistant. Each hardware memory assistant may also stop servicing any memory instructions in the queue, such as retrieving data for read instructions and providing preliminary read responses to the remote processor. This allows for the list of memory addresses accessed by each memory instruction in each hardware memory assistant to remain static during the comparison to memory addresses accessed by memory instructions in the first memory transaction.

The method of FIG. 5 also differs from the method of FIG. 4 in that, in response to determining that the memory addresses accessed in the first memory transaction overlap with the memory addresses accessed in the second memory transaction, aborting (314) the first memory transaction includes aborting (504) the second memory transaction and unlocking the second hardware memory assistant. Aborting (504) the second memory transaction may be carried out by the first hardware memory assistant (212A) sending an abort message to the second hardware memory assistant. After the second hardware memory assistant is unlocked, the second may continue to receive and queue memory instructions in the second memory transaction. Once the second hardware memory assistant receives a TX_END message, the second hardware memory assistant checks whether an abort message was received. Because the second hardware memory assistant received an abort message from the first hardware memory assistant, the second hardware memory assistant aborts the second memory transaction.

The method of FIG. 5 also differs from the method of FIG. 4 in that, in response to determining that the memory addresses accessed in the first memory instructions do not overlap with the memory addresses accessed in the second memory instructions: committing (402) the first memory transaction to memory; and sending, to the first remote processor, a confirmation that the first memory transaction has been committed to memory further includes unlocking (506) the second hardware memory assistant. Unlocking (506) the second hardware memory assistant may be carried out by resuming the receiving and servicing of memory instructions on the second hardware memory assistant (212B).

Unlocking (506) the second hardware memory assistant (212B) may be initiated by the locking management logic on the first hardware memory assistant (212A). The locking management logic may send an unlocking signal to each other hardware memory assistant instructing the hardware memory assistant to initiate an unlock on the hardware memory assistant. In response, each hardware memory assistant may resume receiving memory instructions from the remote processors associated with the hardware memory assistant. Each hardware memory assistant may also resume servicing the memory instructions in the queue.

Figure 6:
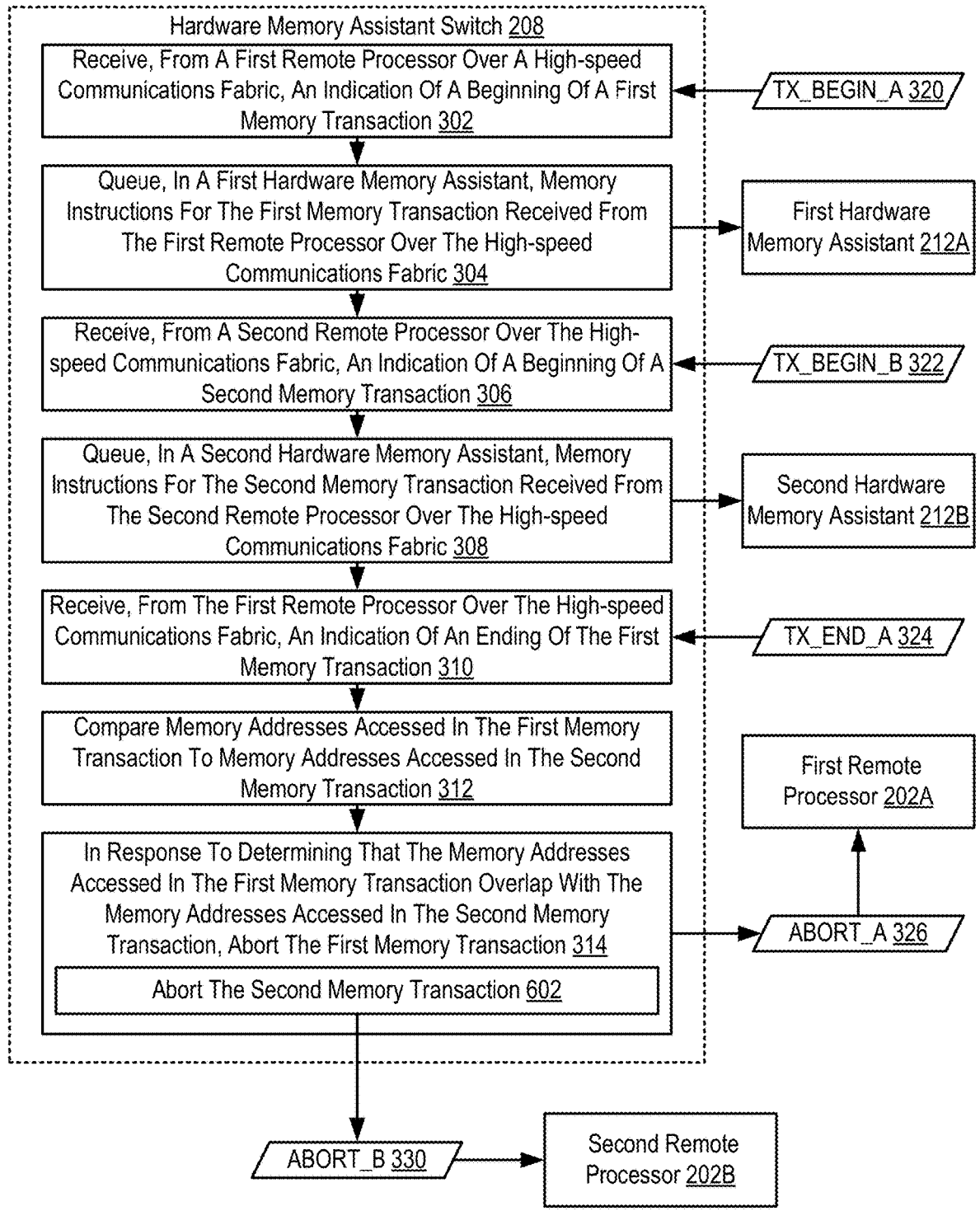
FIG. 6 sets forth a flow chart illustrating an exemplary method for hardware assisted remote transactional memory according to embodiments of the present invention.

For further explanation, FIG. 6 sets forth a flow chart illustrating a further exemplary method for hardware assisted remote transactional memory according to embodiments of the present invention that includes receiving (302), from a first remote processor (202A) over a high-speed communications fabric, an indication of a beginning of a first memory transaction (320); queuing (304), in a first hardware memory assistant (212A), memory instructions for the first memory transaction received from the first remote processor (202A) over the high-speed communications fabric; receiving (306), from a second remote processor over the high-speed communications fabric, an indication of a beginning of a second memory transaction (322); queuing (308), in a second hardware memory assistant (212B), memory instructions for the second memory transaction received from the second remote processor over the high-speed communications fabric; receiving (310), from the first remote processor (202A) over the high-speed communications fabric, an indication of an ending of the first memory transaction (324); comparing (312) memory addresses accessed in the first memory transaction to memory addresses accessed in the second memory transaction; and in response to determining that the memory addresses accessed in the first memory transaction overlap with the memory addresses accessed in the second memory transaction, aborting (314) the first memory transaction.

The method of FIG. 6 differs from the method of FIG. 3, however, in that, in response to determining that the memory addresses accessed in the first memory transaction overlap with the memory addresses accessed in the second memory transaction, aborting (314) the first memory transaction includes aborting (602) the second memory transaction. Aborting (602) the second memory transaction may be carried out by the second hardware memory assistant (212B) sending an abort message (ABORT_B (330)) to the second remote processor (202B). The second hardware memory assistant (212B) may also purge or flush the queue of the memory instructions received as part of the second memory transaction.

Figure 7:
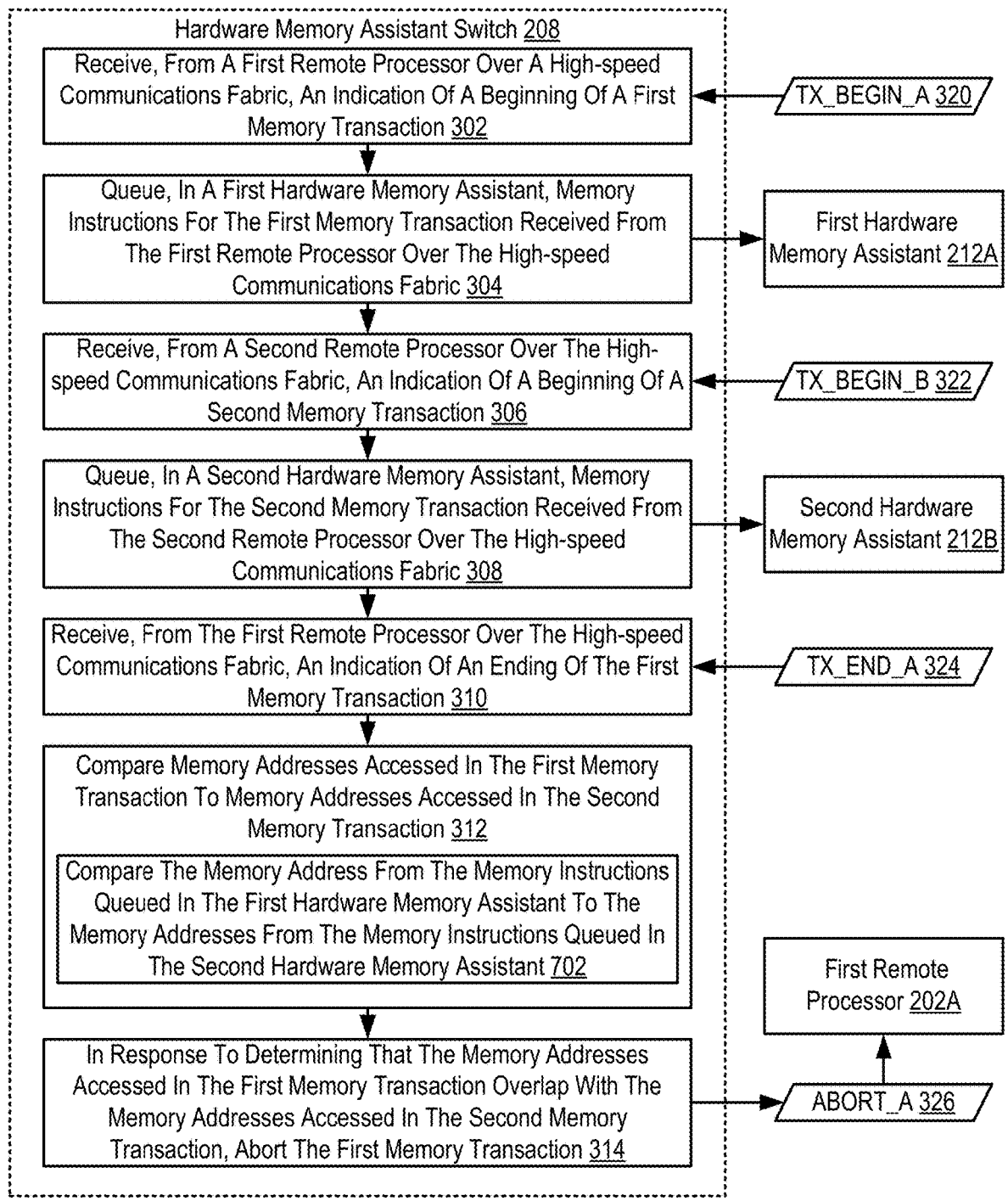
FIG. 7 sets forth a flow chart illustrating an exemplary method for hardware assisted remote transactional memory according to embodiments of the present invention.

For further explanation, FIG. 7 sets forth a flow chart illustrating a further exemplary method for hardware assisted remote transactional memory according to embodiments of the present invention that includes receiving (302), from a first remote processor (202A) over a high-speed communications fabric, an indication of a beginning of a first memory transaction (320); queuing (304), in a first hardware memory assistant (212A), memory instructions for the first memory transaction received from the first remote processor (202A) over the high-speed communications fabric; receiving (306), from a second remote processor over the high-speed communications fabric, an indication of a beginning of a second memory transaction (322); queuing (308), in a second hardware memory assistant (212B), memory instructions for the second memory transaction received from the second remote processor over the high-speed communications fabric; receiving (310), from the first remote processor (202A) over the high-speed communications fabric, an indication of an ending of the first memory transaction (324); comparing (312) memory addresses accessed in the first memory transaction to memory addresses accessed in the second memory transaction; and in response to determining that the memory addresses accessed in the first memory transaction overlap with the memory addresses accessed in the second memory transaction, aborting (314) the first memory transaction.

The method of FIG. 7 differs from the method of FIG. 3, however, in that comparing (312) memory addresses accessed in the first memory transaction to memory addresses accessed in the second memory transaction includes comparing (702) the memory address from the memory instructions queued in the first hardware memory assistant (212A) to the memory addresses from the memory instructions queued in the second hardware memory assistant (212B). Comparing (702) the memory address from the memory instructions queued in the first hardware memory assistant (212A) to the memory addresses from the memory instructions queued in the second hardware memory assistant (212B) may be carried out by locating the memory address within each memory instruction in the second memory transaction and determining if the located memory addresses match any of the memory addresses accessed in the memory instructions of the first memory transaction.

Although FIGS. 3, 4, 5, 6, and 7 describe only a first hardware memory assistant and a second hardware memory assistant, the same steps may be applied to additional hardware memory assistants on the same hardware memory assistant switch.

In view of the explanations set forth above, readers will recognize that the benefits of hardware assisted remote transactional memory according to embodiments of the present invention include:
  Improving the operation of a computing system by using hardware memory assistants for each remote processor to manage memory coherency for shared memory, increasing shared memory stability and reducing latency associated with locking the shared memory with every memory instruction.

Exemplary embodiments of the present invention are described largely in the context of a fully functional computer system for hardware assisted remote transactional memory. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
      receiving, by a first hardware memory assistant within a shared memory system, from a first remote processor over a high-speed communications fabric, an indication of a beginning of a first memory transaction, wherein the shared memory system is remote from the first remote processor and a second remote processor;
      queuing, in a first queue of the first hardware memory assistant, memory instructions for the first memory transaction received from the first remote processor over the high-speed communications fabric;
      receiving, by a second hardware memory assistant within the shared memory system, from the second remote processor over the high-speed communications fabric, an indication of a beginning of a second memory transaction;
      queuing, in a second queue of the second hardware memory assistant, memory instructions for the second memory transaction received from the second remote processor over the high-speed communications fabric;
      receiving, from the first remote processor over the high-speed communications fabric, an indication of an ending of the first memory transaction;
      comparing memory addresses accessed in the first memory transaction to memory addresses accessed in the second memory transaction; and
      in response to determining that the memory addresses accessed in the first memory transaction overlap with the memory addresses accessed in the second memory transaction, aborting the first memory transaction.

2. The method of claim 1, further comprising:
   in response to determining that the memory addresses accessed in the first memory instructions do not overlap with the memory addresses accessed in the second memory instructions:
      committing the first memory transaction to shared memory; and
      sending, to the first remote processor, a confirmation that the first memory transaction has been committed to memory.

3. The method of claim 2, wherein comparing the memory addresses accessed in the first memory transaction to the memory addresses accessed in the second memory transaction comprises locking the second hardware memory assistant; and
   in response to determining that the memory addresses accessed in the first memory instructions do not overlap with the memory addresses accessed in the second memory instructions, unlocking the second hardware memory assistant.

4. The method of claim 1, further comprising: in response to determining that the memory addresses accessed in the first memory transaction overlap with the memory addresses accessed in the second memory transaction, aborting the second memory transaction.

5. The method of claim 1, wherein comparing the memory addresses accessed in the first memory transaction to the memory addresses accessed in the second memory transaction comprises comparing the memory address from the memory instructions queued in the first hardware memory assistant to the memory addresses from the memory instructions queued in the second hardware memory assistant.

6. The method of claim 1, wherein the first hardware memory assistant and the second hardware memory assistant are each a collection of hardware logic and reside on a hardware memory assistant switch communicatively coupled to remote shared memory targeted by the first memory transaction and the second memory transaction, wherein both the hardware memory assistant switch and the remote shared memory are within the shared memory system that is remote from the first and second remote processors.

7. The method of claim 1, wherein the first hardware memory assistant is assigned to the first remote processor, and wherein the second hardware memory assistant is assigned to the second remote processor.

8. An apparatus comprising a computing device, a computer processor, and a computer memory operatively coupled to the computer processor, the computer memory having disposed within it computer program instructions that, when executed by the computer processor, cause the apparatus to carry out the steps of:
receiving, by a first hardware memory assistant within a shared memory system, from a first remote processor over a high-speed communications fabric, an indication of a beginning of a first memory transaction, wherein the shared memory system is remote from the first remote processor and a second remote processor;
queuing, in a first queue of the first hardware memory assistant, memory instructions for the first memory transaction received from the first remote processor over the high-speed communications fabric;
receiving, by a second hardware memory assistant within the shared memory system, from the second remote processor over the high-speed communications fabric, an indication of a beginning of a second memory transaction;
queuing, in a second queue of the second hardware memory assistant, memory instructions for the second memory transaction received from the second remote processor over the high-speed communications fabric;
receiving, from the first remote processor over the high-speed communications fabric, an indication of an ending of the first memory transaction;
comparing memory addresses accessed in the first memory transaction to memory addresses accessed in the second memory transaction; and
in response to determining that the memory addresses accessed in the first memory transaction overlap with the memory addresses accessed in the second memory transaction, aborting the first memory transaction.

9. The apparatus of claim 8, wherein the computer program instructions further cause the apparatus to carry out the steps of:
in response to determining that the memory addresses accessed in the first memory instructions do not overlap with the memory addresses accessed in the second memory instructions:
committing the first memory transaction to shared memory; and
sending, to the first remote processor, a confirmation that the first memory transaction has been committed to memory.

10. The apparatus of claim 9, wherein comparing the memory addresses accessed in the first memory transaction to the memory addresses accessed in the second memory transaction comprises locking the second hardware memory assistant; and
in response to determining that the memory addresses accessed in the first memory instructions do not overlap with the memory addresses accessed in the second memory instructions, unlocking the second hardware memory assistant.

11. The apparatus of claim 8, wherein the computer program instructions further cause the apparatus to carry out the steps of:
in response to determining that the memory addresses accessed in the first memory transaction overlap with the memory addresses accessed in the second memory transaction, aborting the second memory transaction.

12. The apparatus of claim 8, wherein comparing the memory addresses accessed in the first memory transaction to the memory addresses accessed in the second memory transaction comprises comparing the memory address from the memory instructions queued in the first hardware memory assistant to the memory addresses from the memory instructions queued in the second hardware memory assistant.

13. The apparatus of claim 8, wherein the first hardware memory assistant and the second hardware memory assistant are each a collection of hardware logic and reside on a hardware memory assistant switch communicatively coupled to remote shared memory targeted by the first memory transaction and the second memory transaction, wherein both the hardware memory assistant switch and the remote shared memory are within the shared memory system that is remote from the first and second remote processors.

14. The apparatus of claim 8, wherein the first remote processor resides on a first remote server, and wherein the second remote processor resides on a second remote server.

15. A computer program product including a computer readable medium, the computer program product comprising computer program instructions that, when executed, cause a computer to carry out the steps of:
receiving, by a first hardware memory assistant within a shared memory system, from a first remote processor over a high-speed communications fabric, an indication of a beginning of a first memory transaction, wherein the shared memory system is remote from the first remote processor and a second remote processor;
queuing, in a first queue of the first hardware memory assistant, memory instructions for the first memory transaction received from the first remote processor over the high-speed communications fabric;
receiving, by a second hardware memory assistant within the shared memory system, from the second remote processor over the high-speed communications fabric, an indication of a beginning of a second memory transaction;
queuing, in a second queue of the second hardware memory assistant, memory instructions for the second memory transaction received from the second remote processor over the high-speed communications fabric;
receiving, from the first remote processor over the high-speed communications fabric, an indication of an ending of the first memory transaction;
comparing memory addresses accessed in the first memory transaction to memory addresses accessed in the second memory transaction; and
in response to determining that the memory addresses accessed in the first memory transaction overlap with the memory addresses accessed in the second memory transaction, aborting the first memory transaction.

16. The computer program product of claim 15, wherein the computer program instructions further cause the computer to carry out the steps of:

in response to determining that the memory addresses accessed in the first memory instructions do not overlap with the memory addresses accessed in the second memory instructions:

committing the first memory transaction to shared memory; and sending, to the first remote processor, a confirmation that the first memory transaction has been committed to memory.

17. The computer program product of claim 16, wherein comparing the memory addresses accessed in the first memory transaction to the memory addresses accessed in the second memory transaction comprises locking the second hardware memory assistant; and in response to determining that the memory addresses accessed in the first memory instructions do not overlap with the memory addresses accessed in the second memory instructions, unlocking the second hardware memory assistant.

18. The computer program product of claim 15, wherein the computer program instructions further cause the computer to carry out the steps of:

in response to determining that the memory addresses accessed in the first memory transaction overlap with the memory addresses accessed in the second memory transaction, aborting the second memory transaction.

19. The computer program product of claim 15, wherein comparing the memory addresses accessed in the first memory transaction to the memory addresses accessed in the second memory transaction comprises comparing the memory address from the memory instructions queued in the first hardware memory assistant to the memory addresses from the memory instructions queued in the second hardware memory assistant.

20. The computer program product of claim 15, wherein the first hardware memory assistant and the second hardware memory assistant are each a collection of hardware logic and reside on a hardware memory assistant switch communicatively coupled to remote shared memory targeted by the first memory transaction and the second memory transaction, wherein both the hardware memory assistant switch and the remote shared memory are within the shared memory system that is remote from the first and second remote processors, and wherein the hardware memory assistant switch is local to the remote shared memory.

* * * * *